United States Patent
Adams

(10) Patent No.: US 9,305,337 B2
(45) Date of Patent: *Apr. 5, 2016

(54) SYSTEM, METHOD, AND APPARATUS FOR SMOOTHING OF EDGES IN IMAGES TO REMOVE IRREGULARITIES

(71) Applicant: Lattice Semiconductor Corporation, Portland, OR (US)

(72) Inventor: Dale R. Adams, Gualala, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 44 days.

This patent is subject to a terminal disclaimer.

(21) Appl. No.: 14/054,575

(22) Filed: Oct. 15, 2013

(65) Prior Publication Data

US 2014/0105517 A1     Apr. 17, 2014

Related U.S. Application Data

(63) Continuation of application No. 12/204,760, filed on Sep. 4, 2008, now Pat. No. 8,559,746.

(51) Int. Cl.
```
G06K 9/40      (2006.01)
G06T 5/00      (2006.01)
G06T 3/40      (2006.01)
G06T 5/50      (2006.01)
G06T 7/00      (2006.01)
```
(52) U.S. Cl.
CPC ............... *G06T 5/002* (2013.01); *G06T 3/403* (2013.01); *G06T 5/50* (2013.01); *G06T 7/0085* (2013.01); *G06T 2207/20192* (2013.01); *G06T 2207/20221* (2013.01)

(58) Field of Classification Search
USPC ......................................................... 382/266
See application file for complete search history.

(56) References Cited

U.S. PATENT DOCUMENTS

| | | |
|---|---|---|
| 4,997,321 A | 3/1991 | Adams |
| 5,305,106 A | 4/1994 | Fukushima et al. |
| 5,357,606 A | 10/1994 | Adams |

(Continued)

FOREIGN PATENT DOCUMENTS

| | | |
|---|---|---|
| EP | 0881837 | 12/1998 |
| EP | 1039760 | 9/2000 |

(Continued)

OTHER PUBLICATIONS

Co-pending U.S. Appl. No. 10/753,909, filed Jul. 7, 2004.

(Continued)

*Primary Examiner* — John Strege
(74) *Attorney, Agent, or Firm* — Fenwick & West LLP

(57) ABSTRACT

System, method, and apparatus for smoothing of edges in images to remove irregularities are disclosed. In one aspect of the present disclosure, a method of image processing includes, identifying an edge in an image having an associated set of edge characteristics, determining the associated set of edge characteristics, and applying a low pass filter to a pixel of the edge based on the associated set of edge characteristics to generate a second image based on the image, wherein the edge in the image is smoothed in the second image. The method further includes generating a third image which is a blend of the original image and the second (edge-smoothed) image based on the associated set of edge characteristics.

18 Claims, 10 Drawing Sheets

(56) References Cited

U.S. PATENT DOCUMENTS

| | | | |
|---|---|---|---|
| 5,436,668 A | 7/1995 | Tults | |
| 5,532,751 A | 7/1996 | Lui | |
| 5,550,592 A | 8/1996 | Markandey et al. | |
| 5,661,525 A | 8/1997 | Kovacevic et al. | |
| 5,689,301 A | 11/1997 | Christopher et al. | |
| 5,790,269 A | 8/1998 | Masaki et al. | |
| 5,796,875 A | 8/1998 | Read | |
| 5,828,786 A | 10/1998 | Rao et al. | |
| 5,852,475 A | 12/1998 | Gupta et al. | |
| 5,857,118 A | 1/1999 | Adams et al. | |
| 5,920,356 A | 7/1999 | Gupta et al. | |
| 5,926,577 A | 7/1999 | Kasahara et al. | |
| 5,943,099 A | 8/1999 | Kim | |
| 6,055,018 A | 4/2000 | Swan | |
| 6,064,776 A | 5/2000 | Kikuchi et al. | |
| 6,069,664 A | 5/2000 | Zhu et al. | |
| 6,167,164 A | 12/2000 | Lee et al. | |
| 6,181,382 B1 | 1/2001 | Kieu et al. | |
| 6,219,747 B1 | 4/2001 | Banks et al. | |
| 6,285,801 B1 | 9/2001 | Mancuso et al. | |
| 6,380,978 B1 | 4/2002 | Adams et al. | |
| 6,385,692 B2 | 5/2002 | Banks et al. | |
| 6,393,505 B1 | 5/2002 | Scalise et al. | |
| 6,421,090 B1 | 7/2002 | Jiang et al. | |
| 6,459,455 B1 | 10/2002 | Jiang et al. | |
| 6,473,476 B1 | 10/2002 | Banks | |
| 6,489,998 B1 | 12/2002 | Thompson et al. | |
| 6,515,706 B1 | 2/2003 | Thompson et al. | |
| 6,525,774 B1 | 2/2003 | Sugihara | |
| 6,542,199 B1 | 4/2003 | Manbeck et al. | |
| 6,577,345 B1 | 6/2003 | Lim et al. | |
| 6,587,158 B1 | 7/2003 | Adams et al. | |
| 6,621,937 B1 | 9/2003 | Adams, Jr. et al. | |
| 6,681,059 B1 | 1/2004 | Thompson | |
| 6,700,622 B2 | 3/2004 | Adams et al. | |
| 6,757,022 B2 | 6/2004 | Wredenhagen et al. | |
| 6,757,442 B1 | 6/2004 | Avinash | |
| 6,859,237 B2 | 2/2005 | Swartz | |
| 6,867,814 B2 | 3/2005 | Adams et al. | |
| 6,870,562 B2 | 3/2005 | Johnson et al. | |
| 6,975,776 B2 | 12/2005 | Ferguson | |
| 6,999,047 B1 | 2/2006 | Holtslag | |
| 7,012,649 B2 | 3/2006 | Michel | |
| 7,023,487 B1 | 4/2006 | Adams | |
| 7,027,099 B2 | 4/2006 | Thompson et al. | |
| 7,089,577 B1 | 8/2006 | Rakib et al. | |
| 7,126,643 B2 | 10/2006 | Song et al. | |
| 7,136,541 B2 | 11/2006 | Zhang et al. | |
| 7,154,555 B2 | 12/2006 | Conklin | |
| 7,154,556 B1 | 12/2006 | Wang et al. | |
| 7,167,977 B2 | 1/2007 | Morris | |
| 7,206,025 B2 | 4/2007 | Choi | |
| 7,236,209 B2 | 6/2007 | Martin | |
| 7,257,272 B2 | 8/2007 | Blake et al. | |
| 7,265,791 B2 | 9/2007 | Song et al. | |
| 7,321,396 B2 | 1/2008 | Jung et al. | |
| 7,345,708 B2 | 3/2008 | Winger et al. | |
| 7,349,028 B2 | 3/2008 | Neuman et al. | |
| 7,349,029 B1 | 3/2008 | Chou | |
| 7,362,376 B2 | 4/2008 | Winger et al. | |
| 7,379,626 B2 | 5/2008 | Lachine et al. | |
| 7,391,468 B2 | 6/2008 | Shah | |
| 7,400,359 B1 | 7/2008 | Adams | |
| 7,412,096 B2 | 8/2008 | Neuman et al. | |
| 7,414,671 B1 | 8/2008 | Gallagher et al. | |
| 7,417,686 B2 | 8/2008 | Zhu | |
| 7,423,691 B2 | 9/2008 | Orlick et al. | |
| 7,474,354 B2 | 1/2009 | Kawamura et al. | |
| 7,515,205 B1 | 4/2009 | Wang et al. | |
| 7,519,332 B1 | 4/2009 | Suematsu | |
| 7,529,426 B2 | 5/2009 | Neuman | |
| 7,551,800 B2 | 6/2009 | Corcoran et al. | |
| 7,554,602 B2 | 6/2009 | Liao et al. | |
| 7,557,861 B2 | 7/2009 | Wyman | |
| 7,567,724 B2 * | 7/2009 | Gomi et al. | 382/261 |
| 7,605,866 B2 | 10/2009 | Conklin | |
| 7,657,098 B2 | 2/2010 | Lin et al. | |
| 7,659,939 B2 | 2/2010 | Winger et al. | |
| 7,667,773 B2 | 2/2010 | Han | |
| 7,710,501 B1 | 5/2010 | Adams et al. | |
| 7,787,048 B1 | 8/2010 | Vojkovich et al. | |
| 7,796,191 B1 | 9/2010 | Vojkovich | |
| 7,865,035 B2 | 1/2011 | Lin et al. | |
| 7,940,992 B2 | 5/2011 | Johnson et al. | |
| 7,969,511 B2 | 6/2011 | Kim | |
| 7,982,798 B2 | 7/2011 | Adams | |
| 7,986,854 B2 | 7/2011 | Kim et al. | |
| 7,990,471 B1 | 8/2011 | Otobe et al. | |
| 8,189,952 B2 | 5/2012 | Chen et al. | |
| 8,195,002 B2 | 6/2012 | Osamoto et al. | |
| 8,265,416 B2 | 9/2012 | Lin et al. | |
| 8,559,746 B2 * | 10/2013 | Adams | 382/264 |
| 2002/0149685 A1 | 10/2002 | Kobayashi et al. | |
| 2002/0149703 A1 | 10/2002 | Adams et al. | |
| 2002/0176113 A1 | 11/2002 | Edgar | |
| 2002/0196355 A1 | 12/2002 | Hiroshige et al. | |
| 2003/0103680 A1 | 6/2003 | Westerman | |
| 2003/0156301 A1 | 8/2003 | Kempf et al. | |
| 2004/0042673 A1 | 3/2004 | Boon | |
| 2004/0056978 A1 | 3/2004 | Thompson et al. | |
| 2004/0189877 A1 | 9/2004 | Choi et al. | |
| 2004/0207753 A1 | 10/2004 | Jung | |
| 2005/0025382 A1 | 2/2005 | Oizumi et al. | |
| 2005/0046741 A1 | 3/2005 | Wu | |
| 2005/0122433 A1 | 6/2005 | Satou et al. | |
| 2005/0128360 A1 | 6/2005 | Lu | |
| 2005/0129306 A1 | 6/2005 | Wang et al. | |
| 2005/0201626 A1 | 9/2005 | Kang et al. | |
| 2006/0002624 A1 | 1/2006 | Tamura | |
| 2006/0072037 A1 | 4/2006 | Wyman | |
| 2006/0133772 A1 | 6/2006 | Nakajima | |
| 2006/0291741 A1 | 12/2006 | Gomi et al. | |
| 2007/0052845 A1 | 3/2007 | Adams | |
| 2007/0103587 A1 | 5/2007 | MacInnis et al. | |
| 2007/0103588 A1 | 5/2007 | MacInnis et al. | |
| 2007/0223835 A1 | 9/2007 | Yamada et al. | |
| 2008/0117330 A1 | 5/2008 | Winger et al. | |
| 2008/0123998 A1 | 5/2008 | Gomi et al. | |
| 2008/0143873 A1 | 6/2008 | Neuman | |
| 2008/0151103 A1 | 6/2008 | Asamura et al. | |
| 2008/0152253 A1 | 6/2008 | Thompson | |
| 2008/0175512 A1 | 7/2008 | Ohira | |
| 2008/0199099 A1 | 8/2008 | Michel et al. | |
| 2009/0052798 A1 | 2/2009 | Kwon et al. | |
| 2009/0196500 A1 | 8/2009 | Shi et al. | |
| 2009/0262247 A1 | 10/2009 | Huang et al. | |
| 2010/0054622 A1 | 3/2010 | Adams et al. | |
| 2010/0061649 A1 | 3/2010 | Hou et al. | |
| 2010/0110235 A1 | 5/2010 | Higuchi | |
| 2010/0157147 A1 | 6/2010 | Bellers | |
| 2011/0216984 A1 | 9/2011 | Tezuka | |
| 2012/0294525 A1 | 11/2012 | Lukac | |

FOREIGN PATENT DOCUMENTS

| | | |
|---|---|---|
| EP | 1434438 A2 | 6/2004 |
| EP | 1492344 A1 | 12/2004 |
| EP | 1775956 A1 | 4/2007 |
| EP | 1848220 A2 | 10/2007 |
| EP | 1876564 | 1/2008 |
| JP | 8-298603 | 11/1996 |
| JP | 11-191861 | 7/1999 |
| JP | 2001-245155 | 9/2001 |
| JP | 2002-133410 A | 5/2002 |
| JP | 2002-230562 | 8/2002 |
| JP | 2003-61105 | 2/2003 |
| JP | 2004-242285 A | 8/2004 |
| JP | 2005-122361 A | 5/2005 |
| JP | 2005-332130 | 12/2005 |
| JP | 2006-221403 | 8/2006 |
| JP | 2007-213125 A | 8/2007 |
| JP | 2007-312370 A | 11/2007 |
| JP | 2008-522508 A | 6/2008 |

(56) References Cited

FOREIGN PATENT DOCUMENTS

| JP | 4710635 B2 | 6/2011 |
|---|---|---|
| WO | WO 02/05544 A1 | 1/2002 |
| WO | WO 2008/076566 A1 | 6/2008 |

OTHER PUBLICATIONS

Co-pending U.S. Appl. No. 10/889,855, filed Jul. 12, 2004.
Co-pending U.S. Appl. No. 11/487,144, filed Jul. 13, 2006.
Co-pending U.S. Appl. No. 11/512,754, filed Aug. 29, 2006.
Co-pending U.S. Appl. No. 11/941,050, filed Nov. 15, 2007.
Co-pending U.S. Appl. No. 12/703,623, filed Feb. 10, 2010.
Co-pending U.S. Appl. No. 11/437,357, filed May 19, 2006.
International Search Report PCT/US2009/054427 dated Mar. 17, 2010 pp. 1-3.
International Search Report PCT/US2010/023775 dated Oct. 11, 2010, pp. 1-3.
Supplementary European Search Report 06 814 256 dated Mar. 31, 2010, pp. 1-7.
Final Office Action mailed Apr. 19, 2010 for U.S. Appl. No. 11/487,144, filed Jul. 13, 2006.
Non-Final Office Action mailed Aug. 20, 2010 for U.S. Appl. No. 11/487,144, filed Jul. 13, 2006.
Non-Final Office Action mailed Dec. 31, 2009 for Co-Pending U.S. Appl. No. 11/487,144, filed Jul. 13, 2006.
Non-Final Office Action mailed Mar. 18, 2008 for Issued U.S. Pat. No. 7,400,359, U.S. Appl. No. 10/753,909, filed Jan. 7, 2004.
Non-Final Office Action mailed Sep. 11, 2009 for Issued Patent U.S. Pat. No. 7,710,501, U.S. Appl. No. 10/889,855, filed Jul. 12, 2004.
Non-Final Office Action mailed Sep. 23, 2010 for U.S. Appl. No. 11/437,357, filed May 19, 2001.
Notice of Allowance mailed Feb. 8, 2010 for Issued U.S. Pat. No. 7,710,510, U.S. Appl. No. 10/889,855, filed Jul. 12, 2004.
Notice of Allowance mailed May 30, 2008 for Issued U.S. Pat. No. 7,400,359, U.S. Appl. No. 10/753,909, filed Jan. 7, 2004.
Restriction Requirement mailed Feb. 25, 2010 for U.S. Appl. No. 11/437,357, filed May 19, 2006.
Notice of Allowance mailed Sep. 3, 2010 for U.S. Appl. No. 11/512,754, filed Aug. 29, 2006.
Written Opinion PCT/US2006/34785 dated Apr. 4, 2007, pp. 1-4.
Written Opinion PCT/US2007/084881 dated Mar. 25, 2008 pp. 1-4.
Written Opinion PCT/US2009/054427 dated Mar. 17, 2010 pp. 1-3.
Written Opinion PCT/US2010/023775 dated Oct. 11, 2010, pp. 1-5.
Notice of Allowance for U.S. Appl. No. 11/941,050, Mailed Aug. 18, 2011, 10 pages.
"Analog Devices CMOS 180 MHz DDS/DAC Synthesizer", AD9851, Rev. C, Analog Devices, Inc., www.analog.com.pp. 1-23 (1999).
International Search Report PCT/US2006/034785 dated Apr. 4, 2007.
International Search Report PCT/US2007/084881 dated Mar. 25, 2008.
Notice of Allowance for U.S. Appl. No. 11/437,357 mailed Dec. 1, 2010.
Notice of Allowance for U.S. Appl. No. 11/487,144 mailed Dec. 9, 2010.
Non-Final Office Action for U.S. Appl. No. 11/941,050 mailed Feb. 1, 2011.
Non-Final Office Action for U.S. Appl. No. 11/512,754 mailed Jun. 25, 2010.
Non-Final Office Action for U.S. Appl. No. 11/512,754 mailed Dec. 13, 2010.
Notice of Allowance for U.S. Appl. No. 11/512,754 mailed Feb. 7, 2011.
Notice of Allowance for U.S. Appl. No. 11/487,144 mailed Mar. 21, 2011.
Notice of Allowance for U.S. Appl. No. 11/437,357 mailed Mar. 9, 2011.
Office Action for European Patent Application No. 06814256.1 mailed Jul. 16, 2010.
Office Action for European Patent Application No. 06814256.1 mailed Feb. 10, 2011.
Office Action for Canadian Patent Application No. 2,620,820 mailed Aug. 18, 2010.
Non-Final Office Action for U.S. Appl. No. 11/512,754 mailed May 11, 2011.
International Preliminary Report on Patentability for International Patent Application No. PCT/US2009/054427, Mailed Mar. 17, 2011, 5 pages.
Final Office Action for U.S. Appl. No. 11/941,050, mailed Jul. 13, 2011, 16 pages.
Office Action mailed Jun. 20, 2012, in U.S. Appl. No. 13/153,230, 11 pages.
Notice of Preliminary Rejection dated Aug. 23, 2012 (+ English translation), in Korean Patent Application No. 10-2008-7005491, 6 pages.
Notice of Allowance mailed Jan. 24, 2013, in U.S. Appl. No. 12/703,623, 9 pages.
Notice of Last Preliminary Rejection dated Feb. 27, 2013 (+ English translation), in Korean Patent Application No. 10-2008-7005491, 3 pages.
Notification of Reasons for Refusal dated Feb. 21, 2013 (+ English translation), in Japanese Patent Application No. 2011-526098, 9 pages.
Office Action dated Nov. 13, 2012 (+ English translation), in Chinese Patent Application No. 200980140362.8, 12 pages.
Supplementary European Search Report completed Feb. 25, 2013, in European Patent Application No. EP09811959, 10 pages.
Office Action dated May 30, 2013 (+ English Translation), in Chinese Patent Application No. 200980140362.8, 8 pages.
United States Office Action, U.S. Appl. No. 12/304,760, Feb. 22, 2012, 13 pages.
Japanese Office Action, Japanese Application No. 2011-526098, Dec. 11, 2013, 4 pages.
Japanese Office Action, Japanese Application No. 2011-550203, Dec. 2, 2013, 18 pages.
Korean Office Action, Korean Application No. 10-2013-7013559, Feb. 26, 2014, 5 pages.
Chinese Second Office Action, Chinese Application No. 201080011860.5, May 20, 2014, 7 pages.
Japanese Office Action, Japanese Application No. 2011-550203, Jun. 3, 2014, 6 pages (with English summary of office action).
Japanese Office Action, Japanese Application No. 2011-526098, May 27, 2014, 3 pages (with English summary of office action).
European Extended Search Report, European Application No. 10741672.9, Mar. 12, 2015, 9 pages.
Korean Office Action, Korean Application No. 10-2011-7007617, Nov. 14, 2014, 5 pages.
European Examination Report, European Application No. 09811959.7, Apr. 10, 2015, 9 pages.

\* cited by examiner

SYSTEM, METHOD, AND APPARATUS FOR SMOOTHING OF EDGES IN IMAGES TO REMOVE IRREGULARITIES

CROSS-REFERENCE TO RELATED APPLICATION

This application is a continuation of U.S. patent application Ser. No. 12/204,760 filed Sep. 4, 2008, now U.S. Pat. No. 8,559,746 issued Oct. 15, 2013, which application is incorporated herein by reference in its entirety.

BACKGROUND

The human visual system is highly sensitive to the edges of objects in an image (e.g., in a digital image, a physical image, a digital picture, a physical picture, or frames of video). Consequently, irregularities in edges, such as edges that are rough, jagged, or stair-stepped (as is in the case of many types of digitally processed content) present in a physical or electronic image tend to be noticeable and can be objectionable.

There are a number of reasons why such irregular edges may appear in an image, including artifacts from digital compression, poor-quality deinterlacing, and resolution limitations in digital sampling of an image. In addition, conversion of a low-resolution image to a higher resolution will frequently result in the resolution limitations of the original image being visible as irregular edges in the scaled image.

DETAILED DESCRIPTION

Figure 1:
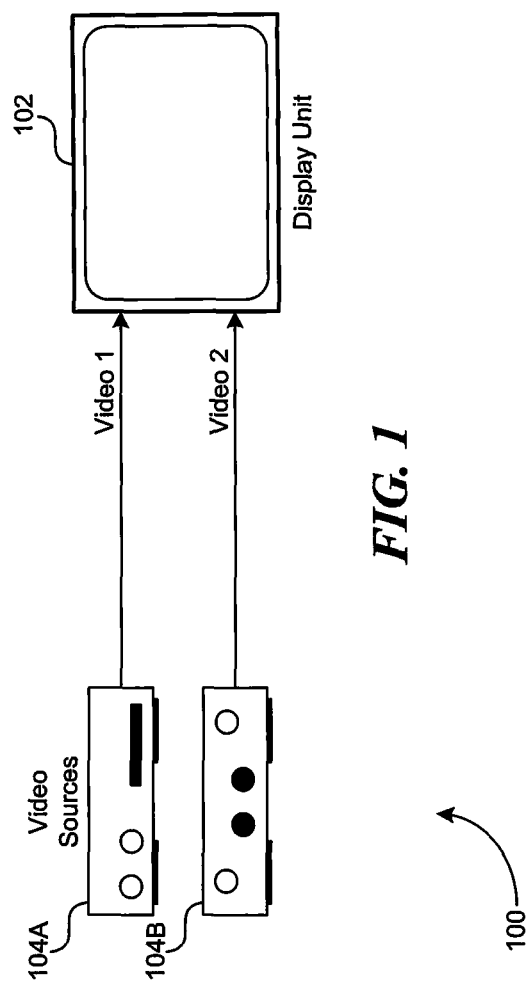
FIG. 1 depicts a block diagram illustrating a home entertainment system with video sources, according to one embodiment.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems, methods, and apparatuses for edge detection and edge smoothing in digital images and digital video.

Irregular edges in images are prevalent in compressed content with a small resolution (e.g., web-based images and video content, streaming content, etc). For example, digital images and/or digital video are frequently compressed to conserve disk space and/or to reduce transmission time. Consequently, digital images or frames of videos frequently have limited resolution and appear low quality to the human eye.

Different video formats have different resolutions, with high-resolution formats such as HD DVD and Blu-ray having significantly higher resolutions than older formats such as DVD, VCD, VHS tape, etc. While the resolution of high-definition sources is often directly compatible with today's digital display devices, lower resolution images and formats must be scaled up to fit a larger display screen. When this is done, edges in the image are magnified and the lower resolution of those edges becomes apparent to the human eye. Cross compatibility between displays, media players, and optical disk readers which support varying formats requires that lower resolution formats often be scaled to a different resolution, resulting in the appearance of rough or irregular edges in the scaled images and/or videos.

Embodiments of the present disclosure include methods for detecting edges in an image or in frames of videos, in particular, for the purposes of reducing or removing the visual displeasure of viewing images and/or videos with rough, jagged or otherwise irregular edges. The edges can be detected via any known, convenient means, or any modification thereof. The strength (e.g., as indicated by the gradient magnitude) and direction of the edges are typically also detected, via any known, convenient means, or any modifications thereof. For example, if the edges have been detected using image gradients, the strength of the edge is determined by computing the gradient magnitude and the direction of the edge can be determined by using the vertical and horizontal components of the gradient to compute the tangent of the edge angle.

Potential presence of irregularities in edges can, in one embodiment, be removed when a directional low pass filter is applied in the direction of the edge thus improving the overall appearance of the image. In some instances, additional processing may be performed to generate yet a further optimized image. This further optimized image can be generated from tracking quantified data regarding the 'accuracy' of the edge detected that depicts how 'strong' the edge is based on the magnitude gradients and edge direction determinations.

For example, the further optimized image, or frames of video, could be an intelligent combination of the original source and the smoothed source such that portions of original content with more deterministic edges are taken from the smoothed source where the portions of the original content with less deterministic edges are taken from the original source. This further optimized image can be generated from tracking quantified data regarding the 'accuracy' of the edge detected that indicates how 'strong' the edge is based on the gradient magnitude and how 'consistent' the edge angle is based on the edge direction determinations.

Embodiments of the present disclosure are applicable to any type of device which receives, generates, or modifies video content for playback or processing purposes. The device can be any type of media player, display device, portable video player (e.g., an iPOD, iPhone, iPOD dock, portable DVD player, etc.), cell phone, desktop computer, laptop computer, Blackberry, etc. The received video or image content can be from various sources without deviating from the novel aspect of the disclosure, including not limited to, Internet content (e.g., streaming or downloaded), locally stored content, content stored on a remote device, and/or content stored on readable media (e.g., magnetic, optics, etc.).

FIG. 1 depicts a block diagram illustrating a system 100 having a display unit 102 coupled to video sources 104A-B, according to one embodiment.

The system 100 includes a display unit 102 (e.g., television set, a plasma display, a CRT display, an LCD display, LED displays, and the like display units) coupled to multiple video sources 104A-B (e.g., audio/video sources such as gaming consoles including but not limited to X-box, PlayStations, media readers including but not limited to VCR, optical disk apparatuses including but not limited to, CD players, DVD players, Blu-ray players, HD-DVD players, and the like A/V sources). In one embodiment, the video sources 104A-B have capabilities of image and/or video edge detection and smoothing edges to remove any potential irregularities that maybe present. The images/video with smoothed edges enhances the visual appearance of digital multimedia displayed on the display unit 102. Similarly, the display unit 102 may have the ability to smooth edges in image or video content. Irregular edges may be present due to inherent limitations of the media content, the optical disk, the video sources 104A-B (e.g., the hardware reading/decoding the media content), or a combination of the above.

Figure 2:
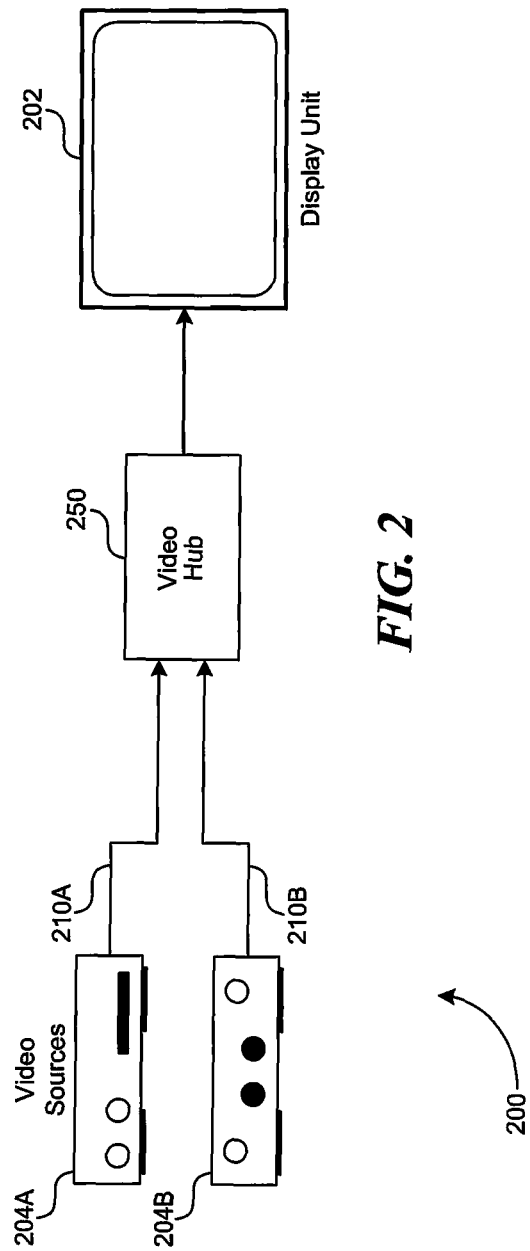
FIG. 2 depicts a block diagram illustrating a home entertainment system having a video hub coupled to video sources, according to one embodiment.

FIG. 2 depicts a block diagram illustrating a system 200 having a video hub 250 coupled to video sources 204A-B, according to one embodiment.

The example system 200 includes video sources 204A-B, a display unit 202, and a video hub 250. The video sources 204A-B can be coupled to the video hub 250 via HDMI connectors, analog video connectors, and/or analog audio connectors. The output of video hub 250 can be coupled to the display unit 202 via HDMI port (e.g., video HDMI) or analog connectors.

The hub 250 routes both audio and video signals in the system 200 from the sources 204A-B to the destination devices (e.g., the display unit 202). In one embodiment, the hub 250 controls the switching and routing of audio and/or video signals by automatic detection of input signals and formats. For example, the hub 250 may be able to detect format and convert analog video inputs and/or analog audio inputs to a digital signal that is HDMI compatible.

In accordance with embodiments of the present disclosure, the video hub 250 has the ability to smooth irregular edges in images and/or videos received from the video sources 204A-B. The edge smoothing capabilities may be implemented via hardware components, software components, and/or any combination/sub-combination thereof. Examples of the components of the video hub 250 are illustrated with further references to FIG. 4-5.

Figure 3:
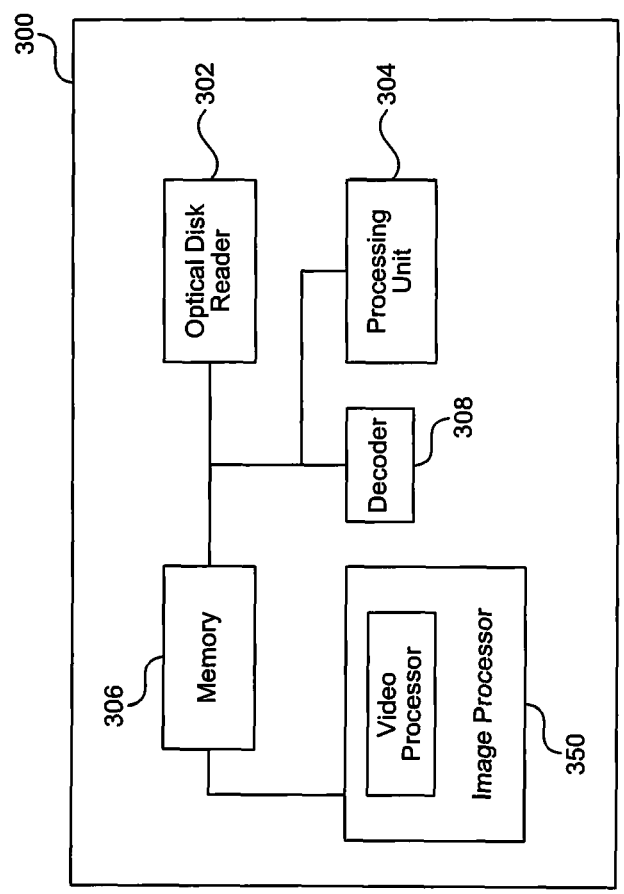
FIG. 3 depicts a block diagram of an optical disk apparatus with edge smoothing capabilities, according to one embodiment.

FIG. 3 depicts a block diagram of a media player illustrated by an optical disk apparatus 300 with capabilities for smoothing edges to remove the potential presence of irregularities, according to one embodiment.

The media player (e.g., optical disk apparatus 300) includes an optical disk reader 302, a processing unit 304, a memory 306, a decoder 308, and/or a image processor 350. In some embodiments, any of the above mentioned modules/devices or the functions represented thereof may be wholly or partially external to media player (e.g., the optical disk apparatus 300). In alternate embodiments, for media players other than an optical disk apparatus, it is appreciated that the optical disk reader 302 may be replaced by any other suitable media reader without deviating from the novel art of the disclosure. The other types of suitable media reader may operate in known and/or convenient means.

The optical disk reader 302 can be any combination of software agents and/or hardware components able to illuminate light on an optical disk, detect light reflected from an optical disk, and/or convert the detected light into an electrical signal. The optical disk reader 302 is able to read any optical disk including but not limited to, CD, DVD, HD-DVD, Blu-ray, and HDV. The compatible optical disks may also be read only memory (ROM, write once—read many (WORM), Interactive (I), and/or erasable (E).

In one embodiment, the optical disk apparatus 300 includes a memory 306 coupled to the optical disk reader 302. The memory 306 can be any combination of software agents and/or hardware components that serve as data input/output buffer for the optical disk reader 302. In one embodiment, the optical disk apparatus 300 includes a decoder 308 coupled to the optical disk reader 302 and the memory 306. The decoder 308 can be any combination of software agents and/or hardware components with codecs that are compatible with hardware decoders and video/audio content. The decoder 308 can receive and decompress digital video and/or audio content. By way of example but not limitation, the decoder 308 typically supports codecs including MPEG-2, H.264/AVC, SMPTE VC-1, and H.263. Dolby Digital, DTS, linear PCM, Dolby Digital Plus, DTS-HD High Resolution Audio, Dolby TrueHD, and DTS-HD Master Audio may also be supported.

One embodiment of the optical disk apparatus 300 includes a processing unit 304 coupled to the optical disk reader 302. In some instances, the processing unit 304 is coupled to the memory 305 and/or the image processor 350. The processing unit 304 can be any combination of software agents and/or hardware components able to execute instructions used by the optical disk apparatus 300. In one embodiment, the processing unit 304 handles internal and/or external requests and performs the necessary computations. The processing unit 304 can communicate with the memory 406, which in some embodiments, stores sequences of instructions executable by the processing unit 304 and/or the image processor 350. One embodiment of the optical disk apparatus 300 includes a image processor 350. In one embodiment, the image processor is coupled to the memory 306. The image processor 350 can be any combination of software agents and/or hardware components able to perform image, video processing, and/or digital audio processing. One embodiment of the image processor 350 includes a video processor. The images can be photographs, drawings, video frames, digital images, animations. The content may be received or retrieved from memory 306.

In one embodiment, the image processor 350 performs some or all of the tasks associated with edge detection and/or smoothing of irregularities in edges in an image or frames of video. Example components of the image processor 350 are illustrated with further reference to FIG. 5. The detected edges are directionally low-pass filtered in the edge direction to smooth out the irregularities in edges. The resulting image can be presented in lieu of the original image. In some embodiments, the image processor 350 intelligently merges the smoothed image and the original image to generate an optimized image. For example, portions of the image where edges reside can be taken from the smoothed image and portions without edges or with weak edges can be taken from the original image. The example process performed by the image processor 350 for edge detection and/or smoothing is further described with reference to the flow charts of FIG. 7-9.

Although the example given above is described with relation to an optical disk reader, it is appreciated that the novel aspects of the present disclosure, such as the aspects related to the functions performed by the image processor, are applicable to devices which may or may not be media players, including, but not limited to, satellite, cable, or IPTV (DSL) setp-top-boxes (e.g., with or without DVR functionality), a portable media player (e.g., an iPOD, Zune, etc.), and/or a portable phone (e.g., mutti-function phones including but not limited to a Blackberry, an iPhone, etc.)

Additionally, the novel functions may also be implemented in a media docking station (e.g., for iPODs, Zune, etc.), Internet based media players (e.g., video on demand Internet content, Apple TV, Netflix, Vudu, Verismo, etc.), a display (e.g., a TV, a monitor, etc.), a DVD recorder, a PC with video output (e.g., Hulu, YouTube, etc.), a gaming console (e.g., Xbox, PS3, Wii, etc.), AVRs, switchers, a digital camcorder, and/or a digital camera.

Figure 4:
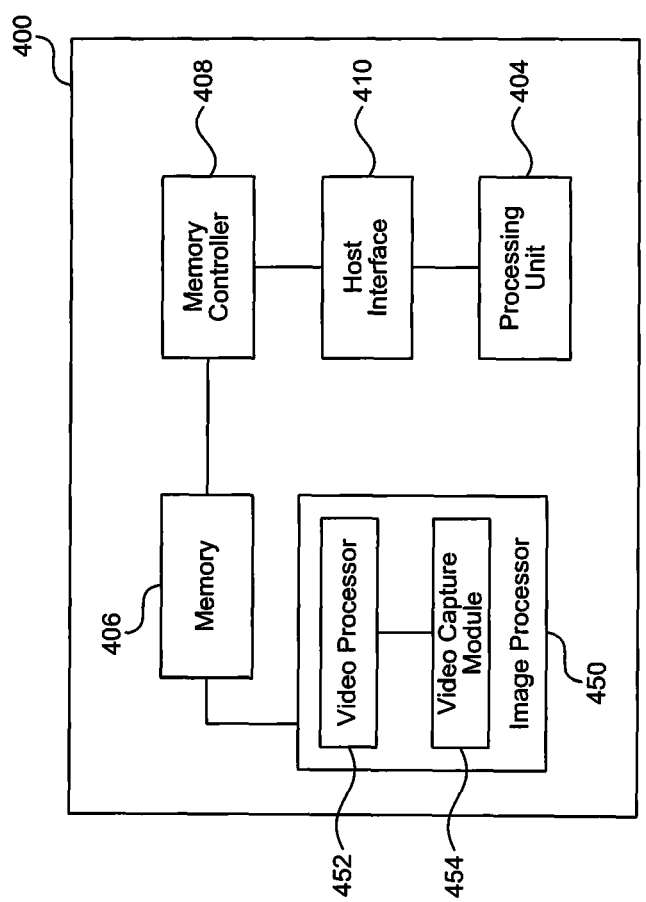
FIG. 4 depicts a block diagram of a system with edge smoothing capabilities, according to one embodiment.

FIG. 4 depicts a block diagram of a system 400 with capabilities for smoothing of edges, according to one embodiment.

The system 400 includes a processing unit 404, a memory 406, a memory controller 408, a host interface 410, and/or a image processor 450. In some embodiments, any of the above mentioned modules/devices or the functions represented thereof may be wholly or partially external to the system 400.

The system 400 is generally able to receive and process digital images, digital video, and/or digital audio originating from a variety of sources, including, but not limited to, Internet content (streaming and/or locally stored), content recorded by a digital imaging device (e.g., camcorder, camera, etc.), user generated content, content stored on a storage media (e.g., VHS, magnetic medium or optical medium), etc. The compatible types of optical media formats can include but is not limited to, CD, DVD, HD-DVD, Blu-ray, and HDV. The compatible optical disks may also be read only memory (ROM, write once—read many (WORM), Interactive (I), and/or erasable (E).

One embodiment of the system 400 includes a processing unit 404 coupled to the memory 406 through the memory controller 408 and/or the host interface 410. The processing unit 404 can be any combination of software agents and/or hardware components able to execute instructions used by the system 400. The instructions may be accessed by communicating with the memory 406.

In one embodiment, the processing unit 404 handles internal and/or external requests and performs the necessary computations. For example, the processing unit 404 can receive a request to open/close the disk drive, to read the disk drive (e.g., when the user hits play), to pause playback, to stop reading the disk drive, etc. and relay the commands to the appropriate modules for execution. The processing unit 404 can communicate with the memory 406, which in some embodiments, stores sequences of instructions executable by the processing unit 404 and/or the image processor 450.

In one embodiment, the system 400 includes a memory 406 coupled to the image processor 450 and/or a memory controller 408. The memory 406 can be any combination of software agents and/or hardware components that serve as data input/output buffer for the image processor 450. The data in the memory 406 can be received from any entity internal to and/or external to the system 400.

One embodiment of the system 400 includes a memory controller 408 coupled to the memory 406 and the host interface 410. The memory controller 408 can be any combination of software agents and/or hardware components able to data from, and/or write data to, memory 406. The memory controller 408 can access memory 406 for memory transactions based upon commands received from the processing unit 404 or other components. Particularly, memory controller 408 coordinates access to memory 406 by various internal and/or external clients, such as, external video, audio, and/or image sources, etc.

In one embodiment, the system 400 optionally includes a host interface 410 coupled to the memory controller 408 and/or the processing unit 404. The host interface 410 can be any combination of software agents and/or hardware components able to manage memory access by the processing unit 404.

Host interface 410 can provide performance access of memory 406 by the processing unit 404. In one embodiment, host interface 410 includes a cache that services memory transactions with the processing unit 404. Cache may be a small, high speed memory that stores the most recently used instructions or data previously retrieved from memory 406. Since programs executed by processing unit 404 typically use a subset of instructions or data repeatedly, cache is an efficient method of servicing processing unit 404 transactions without having to always resort to memory 406.

One embodiment of the system 400 includes a image processor 450. In one embodiment, the image processor is coupled to the memory 406. The image processor 450 can be any combination of software agents and/or hardware components able to perform image, video processing, and/or digital audio processing. One embodiment of the image processor 450 includes a video processor 452 and/or a video capture module 454. The images can be photographs, drawings, video frames, digital images, animations. The content may be received or retrieved from memory 406.

The processes that can be applied by the image processor 450 include by way of example but not limitation, geometric transformations (e.g., enlargement, scaling, reduction, rotation, etc.), color adjustments, brightness adjustments, contrast adjustments, quantization, conversion to a different color space, digital compositing, optical compositing, interpolation, alias reduction, filtering, image editing, image registration, image stabilization, image segmentation, etc.

In one embodiment, the image processor 450 performs some or all of the tasks associated with edge detection and/or edge smoothing in an image or frames of video. Example components of the image processor 450 are illustrated with further reference to FIG. 5. The detected edges are directionally low-pass filtered in the edge direction to smooth out any irregularities in edges. The resulting image can be presented in lieu of the original image. In some embodiments, the image processor 450 intelligently merges the smoothed image and the original image to generate an optimized image. For example, portions of the image where edges reside can be taken from the smoothed image and portions without edges or with weak edges can be taken from the original image. The example process performed by the image processor 450 for edge detection and/or smoothing is further described with reference to the flow charts of FIG. 7-9.

Figure 5:
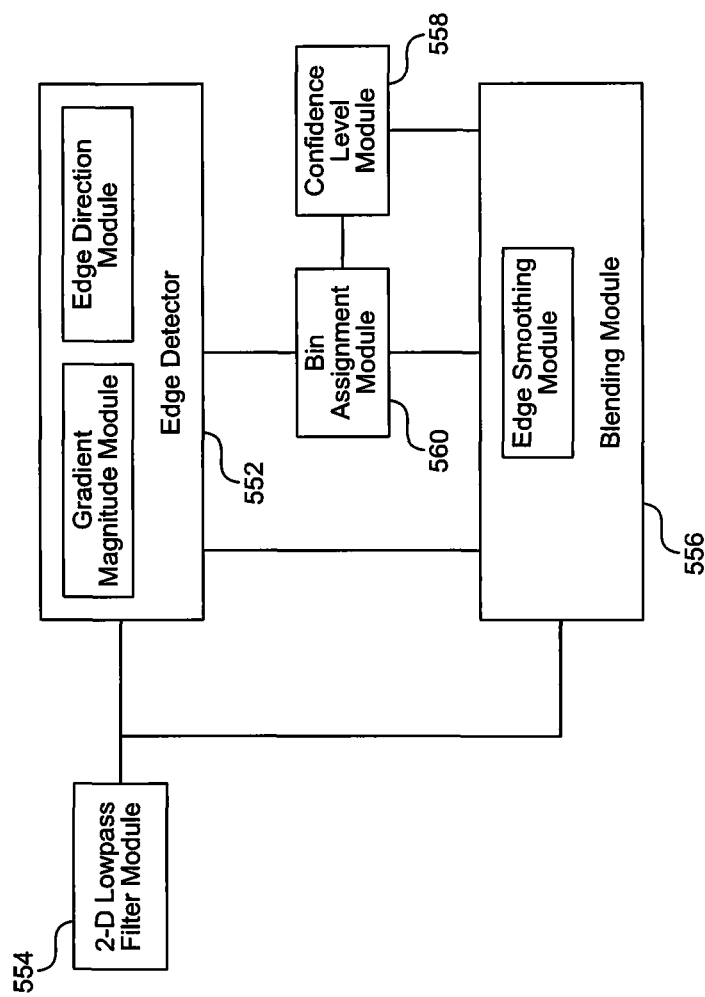
FIG. 5 depicts a block diagram of a image processor with edge smoothing capabilities, according to one embodiment.

FIG. 5 depicts a block diagram of a image processor 550 with edge smoothing capabilities, according to one embodiment.

The image processor 550 includes an edge detector module 552, a filter module 554, a blending module having an edge smoothing module, a confidence level module 558, and/or a bin assignment module 560. In some embodiments, any of the above mentioned modules/devices or the functions represented thereof may be wholly or partially external to the image processor 550.

One embodiment of the image processor 550 includes the edge detector module 552. The edge detector module 552 can be any combination of software agents and/or hardware components able to detect object edges in a digital image and/or frames of videos. The edges can be detected by computing vertical and/or horizontal gradients in the image, for example, via a modified Sobel technique. The gradient filter kernel parameters used for computing gradient values are generally modifiable, adaptable, and adjustable on a case-by-case basis. In one embodiment, the image is low pass filtered to remove or reduce the effects of noise and high frequency components prior to detecting vertical and/or horizontal gradients. The image may be low pass filtered by the filter module 554.

In one embodiment, the edge detector module 552 determines the gradient magnitude of a detected edge. The gradient magnitude can be computed from the vertical gradient and the horizontal gradient, for example, by computing the square root of the sum of the squares of the horizontal and vertical gradients. In one embodiment, gradient magnitude computation is performed by the gradient magnitude module.

In some instances, a threshold value is used in conjunction with the gradient magnitudes to determine the strength of an edge. The threshold value can be dynamically determined for a predetermined pixel area (e.g., 3×3, 5×5, 3×5, 10×10, etc.) based on the dynamic range in the predetermined area. Comparison of the gradient magnitude with the threshold value yields, in one embodiment, a value between 0 and 1 which indicates how strong an edge is. The closer the result is to 1, the stronger the edge is. Additional details related to threshold determination and comparison algorithms are described with further reference to FIG. 6A/B and FIG. 7.

In addition, the edge detector module 552 further determines the edge direction. The edge direction can be determined by computing the tangent of the edge angle formed by the vertical gradient and the horizontal gradient. In one embodiment, prior to computing the tangent of the edge angle, the horizontal and vertical gradient magnitudes can be low pass filtered to reduce the effect of irregularities in the edge direction computation. In addition, the sign of the gradient vector may be median-filtered, for example, by the edge detector module 552 to reduce noise in areas where the edge of the angle is close to horizontal or vertical.

One embodiment of the image processor 550 includes the 2D low pass filter module 554. The filter module 554 can be any combination of software agents and/or hardware components able to apply a low pass filter to an image or portions of image/videos.

A low pass filter can be applied to an image before performing image processing, for example, prior to performing edge detection and/or procedures for smoothing of irregularities in an edge. In one embodiment, a Gaussian shaped filter is applied to the image prior to image processing to remove or reduce high frequency components and noise elements.

In one embodiment, the edge direction is used to determine the bin direction used for directional filtering. Bin assignment is graphically illustrated with further reference to the example of FIG. 6C and can be determined by the bin assignment module 560 via communicating with the edge detector 552. Since the directional filters along the edge directions use pixel values located at specific locations, the edge angle for each pixel is binned into one of a few predetermined bin directions that align with physical pixels in an image. Irregularities in edges are effectively removed or otherwise reduced in jaggedness/roughness once they have been directionally filtered to smooth the edge. In one embodiment, the blending module 556 can generate another image with the smoothed edges having improved visual characteristics by blending the image with the smoothed edges with the original image. The smoothing module of the blending module 556 can apply directional filters to detected edges based on their direction for smoothing of edges to remove potentially existing irregularities.

One embodiment of the image processor 550 includes a blending module 556 having an edge smoothing module. The edge smoothing module can be any combination of software agents and/or hardware components able to smooth irregularities in edges. The edge smoothing module is coupled to the edge detector 552 and bin assignment module 560 and communicates with the edge detector 552 and bin assignment module 560 to determine the locations of the edges and their associated characteristics (e.g., gradient magnitude and/or edge direction).

One embodiment of the image processor 550 includes a confidence level module 558. The confidence level module 558 can be any combination of software agents and/or hardware components able to determine or estimate the accuracy of the computed edge direction (e.g., as indicated by the bin direction) of a detected edge. The confidence level module 558 is coupled to the bin assignment module 560 and communicates with the bin assignment module 560 to determine the bin value of a particular pixel and compares the bin value with the bin values of each pixel within a predetermined pixel area (e.g., 3×3, 5×5, etc.) surrounding the particular pixel. In one embodiment, a statistical attribute of the bin values in the predetermined pixel area can be computed. The statistical attribute can be used to assign a confidence value to the pixel based on its individual bin value and how it compares with the statistical attributes. Since digital images/videos tend to be imperfect, although a pixel is resided on an edge, its characteristics may be flawed so as to not reflect the same attributes (e.g., magnitude gradient and/or edge direction) of the edge.

These effects can be mitigated by performing searches to identify locations where irregularities occur by comparing pixels to one another. In particular, it is advantageous to identify regions where all but few pixels have similar or same characteristics. The few pixels are likely to be anomalies and may negatively impact the results of the directional filtering process for edge roughness smoothing. Therefore, before applying the directional low pass filter, the characteristics (e.g., gradient magnitude, edge direction, and/or bin direction) of the few pixels can be adjusted or modified according to the characteristics of the larger number of pixels in the nearby regions.

In one embodiment, the number of edge directions that are similar to or the same as the edge direction of a particular pixel in a predetermined pixel area (e.g., 3×3, 5×5, 7×7, etc.) are determined, for example, by the confidence level module 558. In general, a higher confidence level is assigned to pixels which have more surrounding pixels with similar or same edge directions, thus indicating a higher accuracy of the computed edge direction. The confidence level value and the results of the gradient magnitude comparison are then used to blend the original image and the directionally low pass filtered image.

The multiplier used in the blending operation is the product of the confidence level and the results of the comparison of the gradient magnitude to the dynamic range based magnitude threshold value. This results in pixels which are located along a strong edge and which have a high confidence level being taken largely (or wholly) from the filtered image. Conversely, pixel locations which do not lie along an edge or which have a low confidence level are taken largely (or wholly) from the original image.

Although embodiments of the present disclosure are described as being performed by an image processor, it is contemplated that the features herein can be embodied within and/or implemented via a video processor/graphics processor, without deviating from the novel art of the disclosure. For example, similar or same image processing functions can also be performed by processing blocks such as dedicated graphics processors or in software on general purpose processors.

Figure 6A:
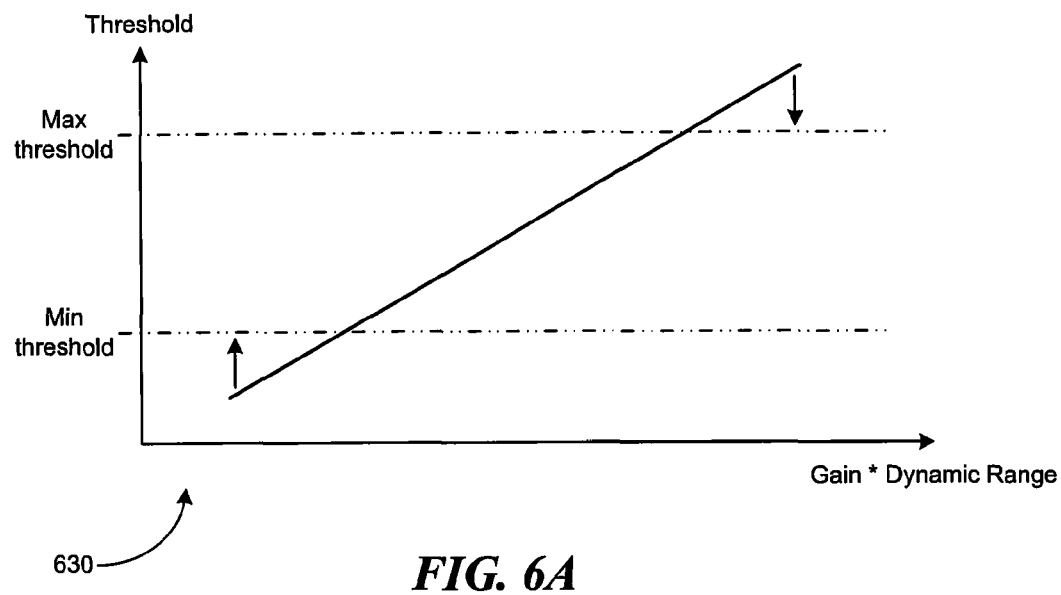
FIG. 6A is a graphical illustration of how the gradient magnitude threshold is determined, according to one embodiment.

FIG. 6A is a graphical illustration of how the gradient magnitude threshold is determined, according to one embodiment.

Plot 630 illustrates the resulting threshold value on the y-axis plotted against a measure of the dynamic range for a predetermined pixel area on the x-axis. The dynamic range for the predetermined area is the maximum or near maximum luminance value in the block minus the minimum or near minimum luminance value. In some instances, the dynamic range is multiplied by a gain value (e.g., 0.5) and depicted on the x-axis and the result of the multiplication is plotted on the y-axis. As shown, if the result of step 1 is greater than a predetermined maximum threshold value or less than a predetermined minimum threshold value, then the threshold is set to the maximum or minimum value, respectively. Otherwise the threshold is dynamic range multiplied by the gain value.

Figure 6B:
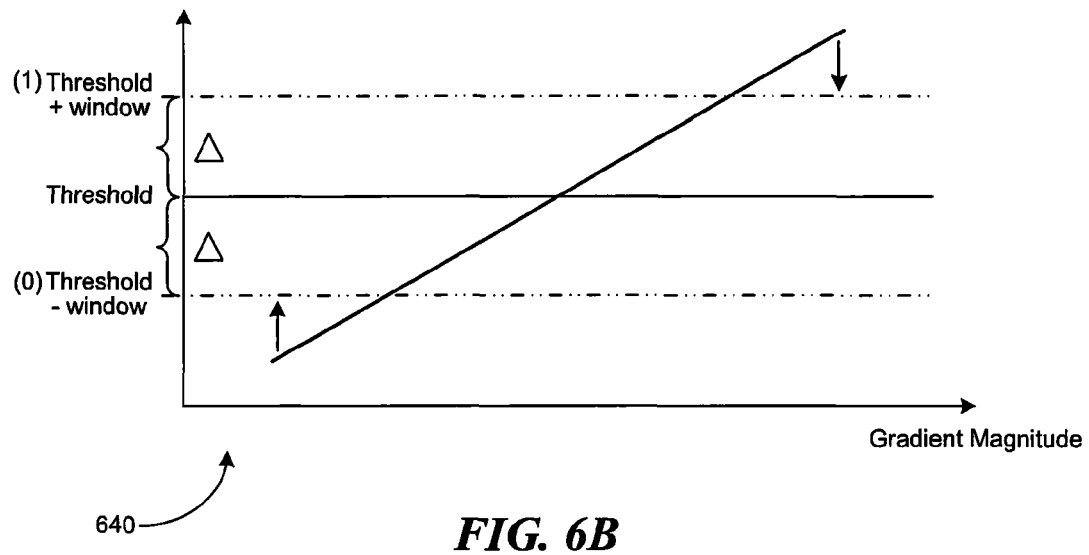
FIG. 6B is a graphical illustration of how the thresholded-magnitude gradient is determined, according to one embodiment.

FIG. 6B is a graphical illustration of how the thresholded-magnitude gradient is determined, according to one embodiment.

Plot 640 illustrates the thresholded gradient magnitude on the y-axis vs. the gradient magnitude plotted on the x-axis. If the gradient magnitude is greater than the threshold plus the window value, then the thresholded-gradient is set to one. The threshold can be dynamically determined as illustrated in FIG. 6A. If the gradient magnitude is less than the threshold minus the window value, then the thresholded-gradient is set to zero. In one embodiment, the window value used in the current implementation is 10/255. Otherwise, the thresholded gradient varies linearly between the two boundaries and can be calculated as:

$$\text{Thresholded Gradient} = (\text{GradientMagnitude} - (\text{Threshold} - \text{Window}))/(2 \times \text{Window})$$

Figure 6C:
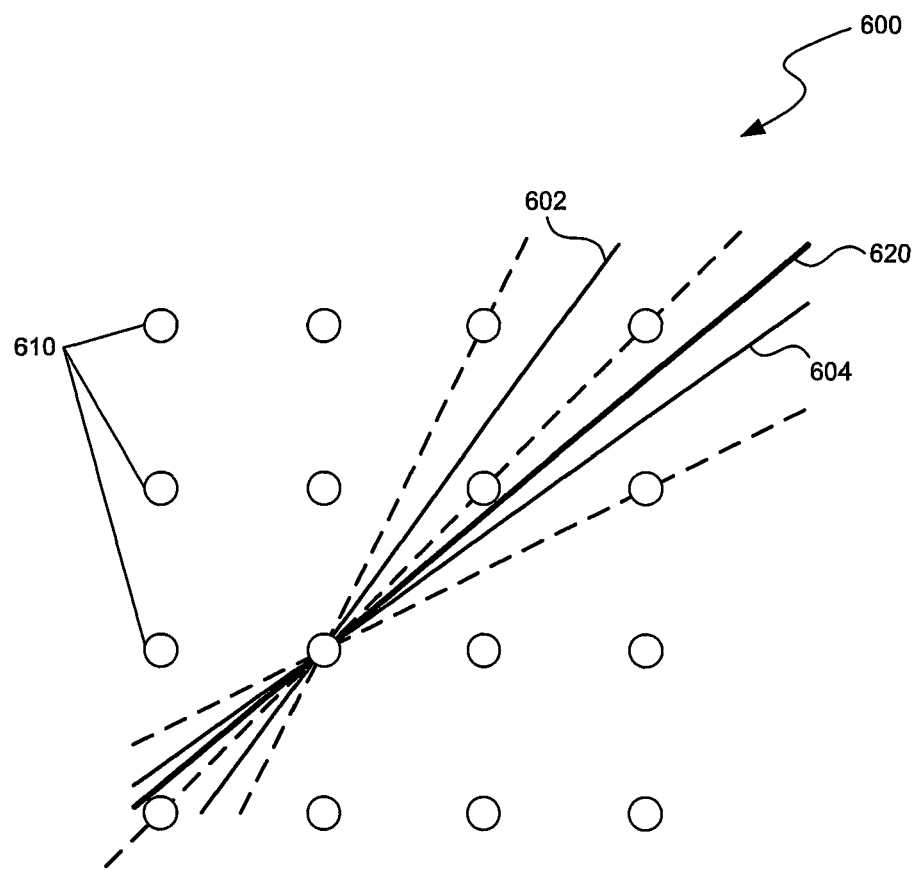
FIG. 6C depicts a diagrammatic representation of image pixels and multiple bins located in the vicinity of a detected edge, according to one embodiment.

FIG. 6C depicts a diagrammatic representation of image pixels and multiple bins located in the vicinity of a detected edge, according to one embodiment.

In the example of FIG. 6C, the video field 600 includes a plurality of known pixels 610, bin division lines 602 and 604, and a detected edge 620. The edge 620 can be detected using any known and/or convenient technique including, but not limited to, being detected via processes and/or functions associated with or performed by the edge detector module (e.g., the edge detector module of FIG. 5). As shown in the example of FIG. 6C, the detected edge is located between bin division lines 602 and 604. As such, the upper boundary of the bin is bin line 602 and the low boundary is bin line 604. Each of the dotted lines which pass through pixel locations form an example set of bin directions. The bin directions can be aligned on specific pixel locations 610 in the video field 600. The bins can be calculated using any known and/or convenient technique. The area enclosed between the upper and lower boundaries forms the bin. In one embodiment, the bin boundaries are the center lines between the lines that connect pixel to pixel.

Figure 7:
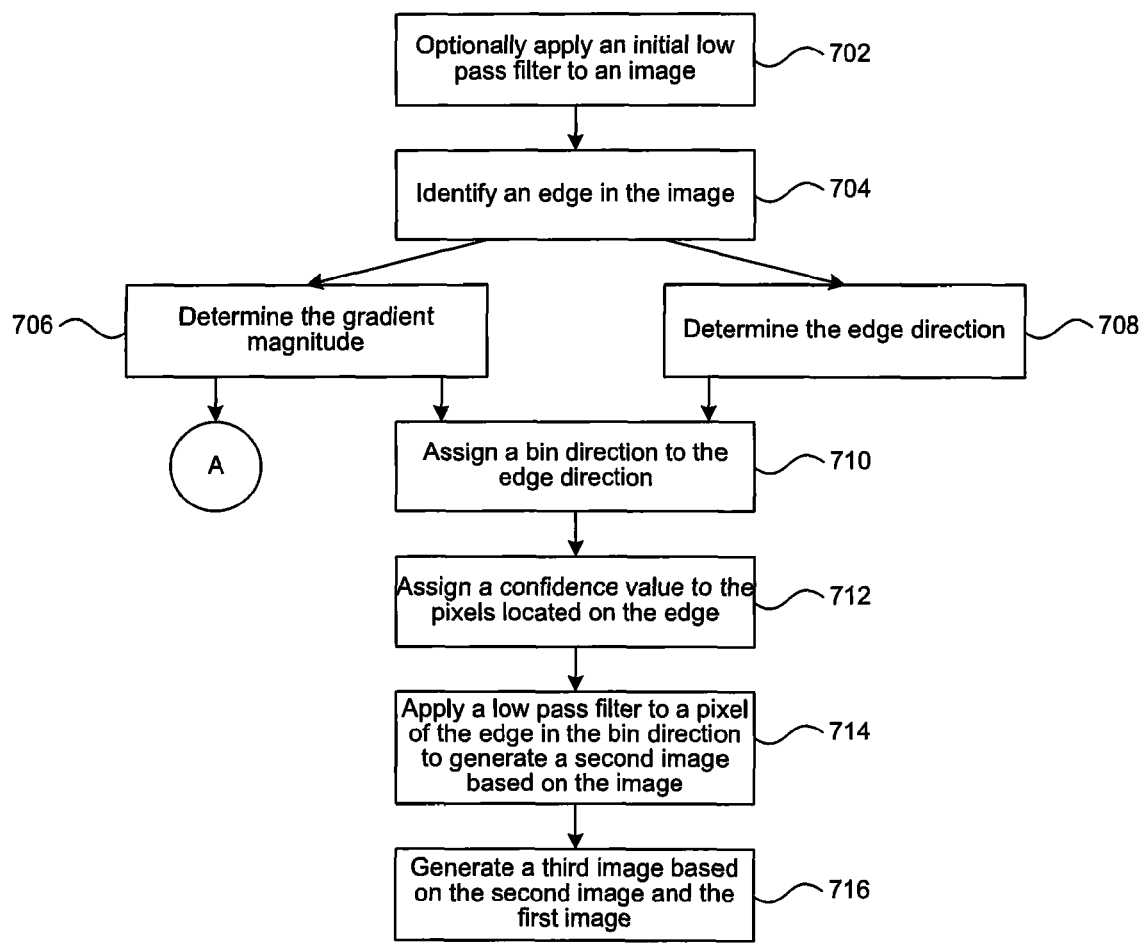
FIG. 7 depicts a flow diagram illustrating an example process of performing edge smoothing in an image, according to one embodiment.

FIG. 7 depicts a flow diagram illustrating an example process of performing smoothing of rough edges in an image, according to one embodiment.

In process 702, an initial low pass filter is optionally applied to an image. The low pass filter can be applied to remove noise and/or high frequencies near the edges prior to edge detection. In one embodiment, a Gaussian shaped filter is used and the parameters of the filter are typically selected dynamically based on the image and its associated image characteristics. For example, a scaled image may have more filtering applied than an image at its original resolution.

In process 704, the presence of an edge in the image is determined. The edge maybe identified from computing the vertical and horizontal gradients via, for example, the modified Sobel technique. The gradient filter kernels are generally selectable depending on how the gradient values are to be used. For example, a larger filter kernel (e.g., 5×5) can be used for gradient values to identify object edges in an image whereas a smaller filter kernel (e.g., 3×3) may be used to generate gradient values to determine edge direction.

In process 706, the gradient magnitude is determined. Irregularities in the detected edges can be removed or reduced which is illustrated with further reference to the example process of FIG. 8. The gradient magnitude is computed from the vertical and horizontal gradient values, for example, using the square root of the sum of squares of the vertical and horizontal gradient values. In one embodiment, the gradient magnitude is used to determine the location of object edges in the image by comparison with a threshold value. The process for edge detection using threshold values is illustrated with further reference to the example of FIG. 9.

In process 708, the edge direction is determined, from the horizontal and vertical gradient magnitudes. The horizontal and/or vertical gradients are optionally low pass filtered to reduce the occurrence of irregularities in the gradient magnitudes prior to determining edge orientation. For example, the sign of the gradient vector can be median-filtered to reduce noise in areas where the edges are near horizontal or near vertical. The tangent of the edge angle can be computed from the horizontal and vertical gradients or the filtered gradients to determine the edge direction.

In process 710, a bin direction is assigned to the edge direction since low pass filtering along edge directions use pixel values located at specific directions. The bin assignment process is illustrated graphically with further reference to the example of FIG. 6C. A small number of bins may be used to reduce the need for the filters using distant pixel locations. In one embodiment, the binned direction values are optionally processed to remove or reduce the number of isolated instances of edge angles which are different from values of surrounding pixels. By comparing the bin direction for each pixel to those of adjacent pixels, irregularities in bin directions may be removed or reduced. For example, if a pixel to the left and right, or above and below a particular pixel location has the same bin direction, the bin value of the pixel can be set to match that of the adjacent pixels.

In process 712, a confidence level is assigned to the pixels on an edge that corresponds to accuracy of the determined edge angle. The confidence level can be computed based on the number of pixels in a predetermined area surrounding a particular pixel having same or similar edge directions. In general, a larger number of similar directions in the surrounding area yields a higher confidence and vice versa.

In process 714, a low pass filter is applied to each pixel of the edge in the bin direction to generate a second image based on the image. This process is performed for each pixel located on edges in the image based on a determined bin direction thus smoothing out the edge irregularities.

In process 716, a third image is generated based on the second image (e.g., the directionally low-pass filtered image) and the first image (e.g., the original image). In one embodiment, the multiplier used in the blending operation is the product of the confidence level and the results of the comparison of the gradient magnitude to the dynamic range based magnitude threshold value. This results in pixels which are located along a strong edge and which have a high confidence level being taken largely (or wholly) from the filtered image. Conversely, pixel locations which do not lie along an edge or which have a low confidence level are taken largely (or wholly) from the original image.

Depending on the image, pre-smoothing and post-smoothing can be alternated or used in conjunction to yield optimal results. For example, higher quality/resolution source images generally do not have rough or jagged edges thus will benefit minimally from edge smoothing at the original resolution of the source image. However, for lower quality/resolution images it is useful to edge-smooth the image prior to subsequent processing, in particular, before scaling the original image to a higher resolution.

Following a scaling operation of a low-resolution image (e.g., 720×480 or lower) to a higher resolution image, the scaled image can be edge-smoothed to reduce the visibility of resolution limitations from the original image. In many cases, both pre-smoothing and post edge-smoothing can be used to optimize image quality. For example, if the scaling ratio is approximately or more than 3×, typically the resulting scaled-up image benefits from edge smoothing. Generally, images scaled up by less than 2× may benefit only marginally.

However, in general, with limited scaling up of an image, pre-smoothing may yield sufficient results. Similarly, with a high quality/resolution source image (e.g., approximately or over 1080 p), only post-smoothing may be needed.

Figure 8:
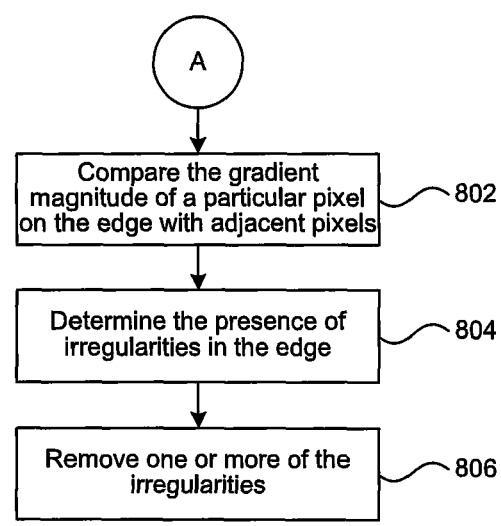
FIG. 8 depicts a flow diagram illustrating an example process for removing irregularities in a detected edge, according to one embodiment.

FIG. 8 depicts a flow diagram illustrating an example process for removing irregularities in a detected edge, according to one embodiment.

In process 802, the gradient magnitude of a particular pixel on the detected edge is compared with the gradient magnitude of the adjacent or surrounding pixels. The adjacent (e.g., surrounding) pixels may be located to the left, right, top, and/or bottom of the particular pixel. In process 804, the presence of irregularities on the edge is determined when a particular pixel value is less than the adjacent pixels. In process 806, the irregularities are removed. In one embodiment, the irregularities are removed by changing the threshold magnitude values of the pixels different from adjacent or surrounding pixels. For example, the threshold magnitude may be changed to the maximum of the threshold values of surrounding pixels.

Figure 9:
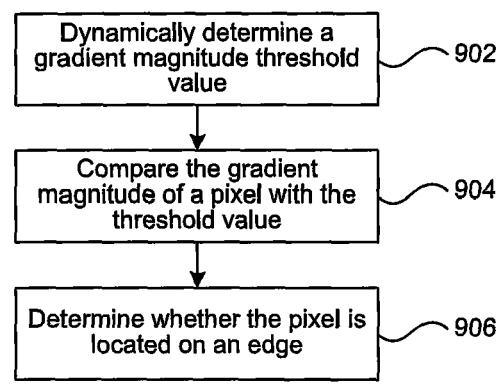
FIG. 9 depicts a flow diagram illustrating an example process of determining whether a pixel is located on an edge based on a dynamically determined gradient magnitude threshold value, according to one embodiment.

FIG. 9 depicts a flow diagram illustrating an example process of determining whether a pixel is located on an edge based on a dynamically determined gradient magnitude threshold value, according to one embodiment.

In process 902, a gradient magnitude threshold value is dynamically determined. In one embodiment, the threshold value is dynamically determined based on a set of pixel values in a predetermined area of the image based on the dynamic range in the area, for example, in a 3×5 pixel area. In process 904, the gradient magnitude of a pixel is compared with the threshold value. The results of the comparison can be quantified on a scale between 0 and 1, where higher values indicate that a pixel is located closer to a strong edge and a lower value indicates that a pixel is located further away from a strong edge. Values of zero generally indicate that a pixel is not located on an object edge.

To generate the results of the comparison on a scale between 0 and 1, the dynamic range in the predetermined area is multiplied by a gain factor (e.g., a value of 0.5). If the result of the multiplication is greater than a predetermined maximum threshold value or less than a predetermined minimum value, then the threshold is set to the predetermined maximum or minimum value, respectively. Otherwise, the threshold is set to be the results of the multiplication of the gain factor with the dynamic range. The threshold computation process is illustrated graphically with further reference to the example of FIG. 6A. In one embodiment, the predetermined maximum and minimum value used are 55/255 and 15/255.

In comparing the gradient magnitude to the threshold to generate the thresholded-gradient, a window is used around the threshold value for purposes of the comparison to determine whether the pixel is located on an edge, as in process 906. In one embodiment, if the gradient magnitude is greater than the threshold value plus the window value, the thresholded-gradient is set to one. If the gradient magnitude is less than the threshold minus the window value, then the thresholded-gradient is set to zero. The intermediate values vary linearly between the threshold plus the window and the threshold minus the value. This process is illustrated graphically with further reference to the example of FIG. 6B. In one embodiment, the window value is 10/255.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A method of image processing, comprising:
    applying an initial low pass filter to a first image to reduce noise and high frequency variations prior to edge smoothing;
    identifying an edge in the first image, the edge having an associated set of edge characteristics, the associated set of edge characteristics comprising a gradient magnitude of the edge and an edge direction of the edge;
    determining the gradient magnitude;
    determining the edge direction;
    assigning a bin direction to the edge direction, wherein bin boundaries are center lines between lines that connect pixel to pixel;
    applying a low pass filter directionally to a pixel of the edge in the assigned bin direction to generate a second image based on the image, wherein the edge in the first image is smoothed in the second image; and
    generating a third image based on the second image and the first image, wherein the third image is generated from blending a portion of the second image having the smoothed edge and a portion of the first image.

2. The method of claim 1, further comprising processing binned edge direction values to remove or reduce number of isolated instances of edge angles.

3. The method of claim 1, further comprising processing binned edge direction values such that if the pixel to the left and the pixel to the right of a certain pixel have the same edge direction value, then the edge direction value of the pixels to the left and to the right are assigned to the certain pixel.

4. The method of claim 1, further comprising processing binned edge direction values such that if the pixel above and the pixel below a certain pixel have the same edge direction value, then the edge direction value of the pixels above and below are assigned to the certain pixel.

5. The method of claim 1, wherein determining the edge direction comprises applying a low-pass filter to the horizontal gradient magnitudes.

6. The method of claim 1, wherein determining the edge direction comprises applying a low-pass filter to the vertical gradient magnitudes.

7. The method of claim 1, wherein determining the edge direction comprises applying a median filter to the sign of the gradient vector.

8. The method of claim 1, further comprising assigning a confidence level to each of a plurality of pixels located on the edge, the confidence level corresponding to accuracy of the edge direction that is detected.

9. The method of claim 8, wherein a multiplier for the blending of the second image and the first image is a product of a pixel confidence level regarding the edge direction and a comparison of a gradient magnitude of the edge of a threshold value.

10. A system, comprising:
a memory controller coupled to a memory, wherein the memory controller controls access to the memory; and
an image processor coupled to the memory, wherein the image processor executes an algorithm that:
identifies an edge in an image;
determines the gradient magnitude of the edge;
determines the edge direction of the edge;
assigns a bin direction to the edge direction determined for the edge;
applies a low pass filter directionally to a pixel of the edge based on the edge direction to generate a second image based on the image, wherein the edge in the first image is smoothed in the second image; and
generates a third image based on the second image and the first image, wherein the third image is generated from blending a portion of the second image having the smoothed edge and a portion of the first image.

11. The system of claim 10, wherein the algorithm further processes binned edge direction values to remove or reduce number of isolated instances of edge angles.

12. The system of claim 10, wherein the algorithm further processes binned edge direction values such that if the pixel to the left and the pixel to the right of a certain pixel have the same edge direction value, then the edge direction value of the pixels to the left and to the right are assigned to the certain pixel.

13. The system of claim 10, wherein the algorithm further processes binned edge direction values such that if the pixel above and the pixel below a certain pixel have the same edge direction value, then the edge direction value of the pixels above and below are assigned to the certain pixel.

14. The system of claim 10, wherein determining the edge direction comprises applying a low-pass filter to the horizontal gradient magnitudes.

15. The system of claim 10, wherein determining the edge direction comprises applying a low-pass filter to the vertical gradient magnitudes.

16. The system of claim 10, wherein determining the edge direction comprises applying a median filter to the sign of the gradient vector.

17. The system of claim 10, wherein the algorithm further assigns a confidence level to each of a plurality of pixels located on the edge, the confidence level corresponding to accuracy of the edge direction that is detected.

18. The system of claim 17, wherein a multiplier for the blending of the second image and the first image is a product of a pixel confidence levels regarding the edge direction and a comparison of a gradient magnitude of the edge to a threshold value.

* * * * *